United States Patent [19]

Sakagami et al.

[11] Patent Number: 4,543,294
[45] Date of Patent: Sep. 24, 1985

[54] POLYMER DIELECTRIC COMPRISING COPOLYMER OF VINYLIDENE FLUORIDE, TETRAFLUOROETHYLENE AND ETHYLENE

[75] Inventors: Teruo Sakagami; Noriyuki Arakawa, both of Iwaki; Haruko Kakutani, Ichikawa, all of Japan

[73] Assignee: Kureha Kagaku Kogyo Kabushiki Kaisha, Tokyo, Japan

[21] Appl. No.: 615,535

[22] Filed: May 31, 1984

[30] Foreign Application Priority Data

Jun. 4, 1983 [JP] Japan ................................. 58-98777

[51] Int. Cl.$^4$ ........................ B32B 27/00; H01G 4/08
[52] U.S. Cl. .................................... 428/422; 428/421; 428/333; 428/220; 361/323; 526/242; 526/250; 526/255
[58] Field of Search ................ 526/255, 227; 428/220, 428/337, 421, 422, 333; 361/323

[56] References Cited

U.S. PATENT DOCUMENTS

| 4,166,165 | 8/1979 | Hisasue et al. | 428/422 |
| 4,434,209 | 2/1984 | Sasaki et al. | 428/422 |
| 4,435,475 | 3/1984 | Sasaki et al. | 428/422 |

FOREIGN PATENT DOCUMENTS

| 875765 | 10/1970 | Italy | 526/255 |
| 1011577 | 12/1965 | United Kingdom | 526/255 |

OTHER PUBLICATIONS

Derwent Publication—JP Pat. Pub. 7325415, (Summary).
Derwent Publication—Ge Offen. 2132463, (Summary).

*Primary Examiner*—Joseph L. Schofer
*Assistant Examiner*—Fred Teskin
*Attorney, Agent, or Firm*—Wenderoth, Lind & Ponack

[57] ABSTRACT

A copolymer of 20 to 33 mol. % vinylidene fluoride, 15 to 45 mol. % of ethylene and 30 to 65 mol. % of tetrafluoroethylene gives a dielectric material having a large dielectric constant of 4.0 or above and a small dielectric dissipation factor (tan $\delta$) of 0.8% or below, and is suitable for use as a condenser film.

7 Claims, 2 Drawing Figures

POLYMER DIELECTRIC COMPRISING COPOLYMER OF VINYLIDENE FLUORIDE, TETRAFLUOROETHYLENE AND ETHYLENE

BACKGROUND OF THE INVENTION

1. Field of the Invention

The present invention relates to a vinylidene fluoride-based polymer dielectric having a combination of a high dielectric constant and a low dielectric dissipation factor.

2. Description of the Prior Art

Polymer dielectrics are widely used, for example, as materials for electric capacitors or condensers mainly of small sizes, because they can be easily formed into films. Polymer dielectric materials well known heretofore include polyethylene, polyethylene terephthalate (hereinafter abbreviated as "PET"), polycarbonate, and polystyrene. Among these, PET has both a relatively low dissipation factor (hereinafter referred to as "tan $\delta$") of about 0.6% at 20° C. and 1 kilo-hertz (KHz), and an excellent film forming property, and is widely used as a useful polymer dielectric material.

However, while PET has a low tan $\delta$, it also has a small dielectric constant of about 3.2 at 20° C. and 1 KHz. Moreover, PET is relatively hygroscopic and therefore has a drawback that its dielectric properties vary according to change in enviromental conditions. On the other hand, polyvinylidene fluoride (hereinafter abbreviated as "PVDF") has the highest level of dielectric constant among the synthetic polymers, has an excellent shapability or processability and also has a low hygroscopicity which is an advantageous feature as a dielectric material when compared with PET. However, PVDF has a tan $\delta$ of about 1.0% or above which is larger than about 0.6% for PVDF, and is not desirable as a material for usage requiring small dielectric loss.

SUMMARY OF THE INVENTION

A principal object of the invention is, in view of the above circumstances, to provide a vinylidene fluoride-based polymer dielectric having a low tan $\delta$ comparable with that of PET, and also having a good shapability or processability, while retaining a dielectric constant higher than that of PET.

As a result of our researches, it has been discovered that the above object can be accomplished by a vinylidene fluoride-ethylene-tetrafluoroethylene copolymer formulated in specific component proportions. The polymer dielectric of the present invention is provided based on the above knowledge and, more specifically, comprises a copolymer of 20 to 33 mol. % of vinylidene fluoride, 15 to 45 mol. % of ethylene and 30 to 65 mol. % of tetrafluoroethylene, and has a dielectric constant of 4.0 or larger and a dielectric dissipation factor (tan $\delta$) of 0.8% or less at 20° C. and 1 KHz.

A vinylidene fluoride-ethylene-tetrafluoroethylene terpolymer per se has been known as a kind of tetrafluoroethylene-ethylene-fluoroethylene copolymer (as disclosed in Japanese Patent Publication No. 25415/1973). The series of copolymers was simply developed as a class of heat-resistant copolymers with good shapability, and the vinylidene fluoride-ethylene-tetrafluoroethylene terpolymer as disclosed therein has not been recognized at all as a useful dielectric material. Especially, it has been first discovered by us that the terpolymer satisfying the proportions as specified by the present invention is a dielectric material provided with both a high dielectric constant and a low tan $\delta$. Further, when a copolymer is produced through solution polymerization as disclosed in the above publication, the resultant copolymer has a low molecular weight, poor shapability into film, and fails to give a low tan $\delta$ as desired (See Comparison Example appearing hereinafter).

These and other objects and features of the present invention will be more readily apparent in view of the following detailed description and the accompanying drawings.

DETAILED DESCRIPTION OF THE INVENTION

Figure 1:
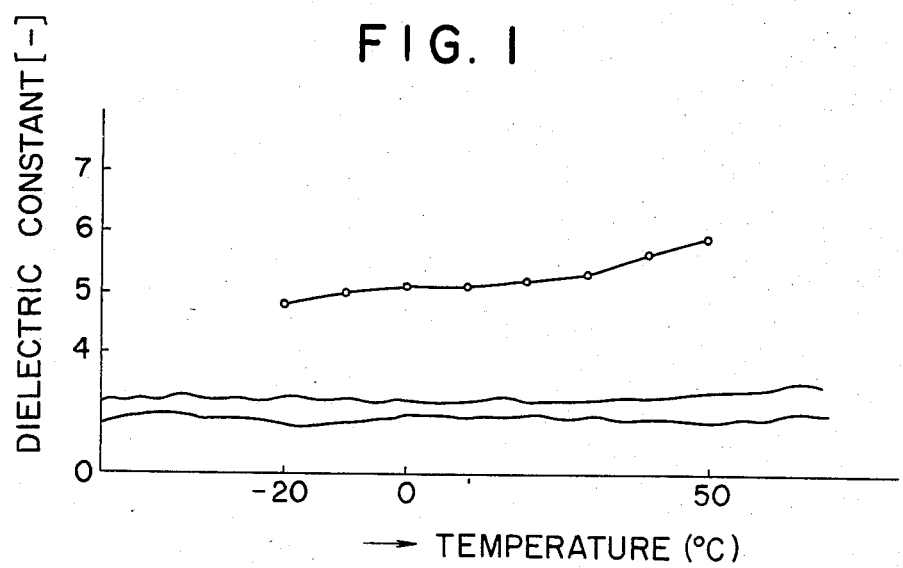
FIG. 1 and FIG. 2 are graphs respectively showing the values of dielectric constant and dielectric dissipation factor (tan $\delta$) plotted against varying temperature measured at 30 Hz with respect to a terpolymer film obtained in Example 2 hereinafter.

The copolymer constituting the dielectric of the invention contains three components of vinylidene fluoride, ethylene and tetrafluoroethylene as indispensable components, and any two of them without the third fail to give the desired properties. Thus, vinylidene fluoride and ethylene have poor copolymerizability with each other, and a copolymer with a high dielectric constant and low tan $\delta$ has not yet been obtained from the combination of these. While copolymers of vinylidene fluoride and tetrafluoroethylene have been widely known, they have extremely poor shapability and it is difficult to shape them into films adapted for condenser materials if the content of tetrafluoroethylene is large. In contrast thereto, if the vinylidene fluoride content is large, the resultant vinylidene fluoride-tetrafluoroethylene copolymer will have properties similar to those of PVDF having a high dielectric constant, but it is also very difficult to lower the tan $\delta$ of the copolylmer. Further, while a copolymer of ethylene and tetrafluoroethylene is also known as a heat-resistant resin with good shapability, and has a low tan $\delta$, it has a small dielectric constant.

In order to obtain the desired dielectric properties in combination, it is very important to restrict the proportions among the three components. Namely, only the copolymer having a limited composition of 20 to 33 mol. % of vinylidene fluoride, 15 to 45 mol. % of ethylene and 30 to 65 mol. % of tetrafluoroethylene, is used in the invention.

If the content of vinylidene fluoride in the product copolymer is less than 20 mol. %, the copolymer will have a dielectric constant of below 4.0. In contrast thereto, if the vinylidene fluoride content exceeds 33 mol. %, the copolymer, while having a large dielectric constant, will have a tan $\delta$ of above 0.8%, and thus fails to give the required dielectric properties in combination.

When the ethylene content is less than 15 mol. %, the contents of vinylidene fluoride and tetrafluoroethylene become relatively larger, whereby the resultant copolymer becomes poor in shapability so that it is difficult to shape it into films, and moreover the tan $\delta$ thereof increases. On the contrary, when the ethylene content is above 45%, the copolymerizability of the composition becomes poor whereby the production of the copolymer becomes difficult.

Next, when the tetrafluoroethylene content is below 30 mol. %, the contents of ethylene and vinylidene fluoride, having poor copolymerizability with each other, become large, and it is difficult to produce a desired random copolymer. When above 65 mol. %, the product copolymer will have good heat-resistance but extremely poor shapability, whereby it is difficult to form thin films therefrom.

While the polymer dielectric of the invention comprises three components of vinylidene fluoride, ethylene and tetrafluoroethylene as indispensable components, it can also contain a minor amount, e.g. 5 mol. % or less, of a monomer copolymerizable with the above three components, with the proviso that the resultant copolymer satisfies the required dielectric properties, that is, a dielectric constant of 4.0 or above and a tan $\delta$ of 0.8% or below at 20° C. and 1 KHz. Examples of such copolymerizable monomers include propylene, isobutylene, vinyl fluoride, trifluoroethylene, trifluoromonochloroethylene and hexafluoropropylene.

The copolymer constituting the polymer dielectric of the invention is generally produced by several types of polymerization processes applicable for production of vinylidene fluoride copolymers, and preferably by a suspension polymerization process using water as the dispersion medium or a bulk polymerization process, both using a polymerization initiator such as a peroxide initiator, azo-type initiator or an ionizing radiation. On the contrary, by a solution or suspension polymerization using an organic solvent as dispersion medium, it is difficult to produce a copolymer having a sufficiently large degree of polymerization, and the resultant copolymer not only is poor in physical properties but also fails to give desired dielectric properties, especially a low tan $\delta$.

The polymer dielectric of the present invention also has good shapability and is readily shaped into a dielectric in the form of a film or sheet through heat forming processes. As the heat forming processes for production of films or sheets, known forming processes are generally available, including those using hot presses, extruders or calendering rolls. In order to obtain an especially thin film, it is possible to further subject the thus obtained film or sheet to roll pressing or mono- or multiaxial stretching. Particularly, by the stretching, some improvement in dielectric properties can be attained along with the formation of thin films.

As has been described hereinabove, the present invention provides a vinylidene fluoride-ethylene-tetrafluoroethylene copolymer of a specific composition, which has a dielectric constant larger than that of PET and a dielectric dissipation factor (tan $\delta$) substantially equal to that of PET, and also is excellent in anti-hygroscopicity, heat resistance and shapability. Accordingly, the dielectric is especially useful as a material for electric condenser films for which a high dielectric constant and a low dielectric loss are required in combination. When used as a condenser material, the polymer dielectric of the invention is preferably formed into film of 1-200 microns, particularly a stretched film of 1-100 microns in thickness. Furthermore, these films may be used as a condenser film laminate composed of a plurality of films stacked in layers. In this case, each film layer should preferably have a thickness of 1 to 50 microns.

The present invention will be explained more specifically hereinbelow by referring to actual examples and comparison examples. In the following description, the dielectric constants and tan $\delta$ represent values obtained by measurement at 20° C. and 1 KHz unless otherwise noted.

EXAMPLE 1

Into a 1 liter-autoclave provided with a stirrer was charged 580 g of distilled water, 0.2 g of methylcellulose (suspension aid) and 4.0 g of n-propylperoxydicarbonate. After replacement with nitrogen, 48.6 g (25 mol. %) of vinylidene fluoride, 29.8 g (35 mol. %) of ethylene and 121.6 g (40 mol. %) of tetrafluoroethylene were further charged, and the mixture was subjected to polymerization under stirring at 30° C. When the pressure was lowered to 9 kg/cm$^2$, well degassed distilled water was charged into the system under nitrogen pressure so as not to lower the pressure below 10 kg/cm$^2$, and the polymerization was continued to obtain a terpolymer. Thus, a copolymer having a composition substantially the same as the charged composition was obtained at a yield of above 98%.

The thus obtained copolymer was a resin excellent in heat resistance and having a melting point of 254° C. and was readily formed into a sheet having a thickness of about 150 microns by hot pressing. The pressed sheet had dielectric properties as shown below:
Dielectric constant ($\epsilon'$): 5.0
Dielectric dissipation factor (tan $\delta$): 0.65%

Thus, the terpolymer obtained was found to be a useful dielectric material having a large dielectric constant and a relatively small tan $\delta$.

EXAMPLE 2

Figure 2:
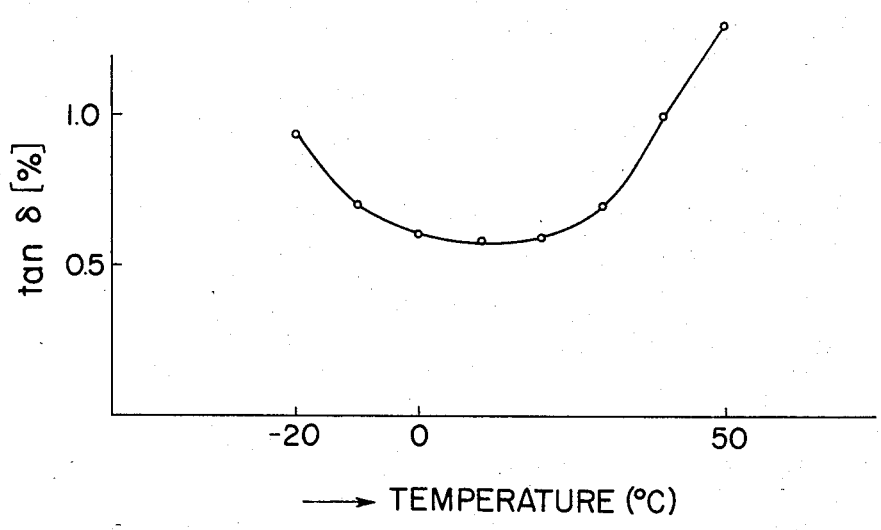

The terpolymer sheet obtained in Example 1 was stretched in a ratio of about 4 times at 100° C. to obtain a film of 70 microns in thickness. Thus, the terpolymer was found to have excellent shapability and be readily stretchable. The stretched film had a dielectric constant of 5.15 and a tan $\delta$ of 0.62% at 20° C. and 1 KHz. The variation with temperature of dielectric constant and tan $\delta$ of the stretched film was measured at 30 Hz by a rheograph (mfd. by Toyo Seiki K.K.). The results of the measurement are shown in FIGS. 1 and 2, respectively.

Thus, the terpolymer of the invention has a small temperature dependence of the dielectric constant and tan $\delta$ within a practical temperature range and is found to be a useful dielectric also from this point.

EXAMPLE 3

In a manner similar to that of Example 1, a terpolymer having mole ratios of vinylidene fluoride/ethylene/tetrafluoroethylene of 30/25/45 was produced. The thus obtained copolymer had a melting point of 258° C. and showed the following dielectric properties when formed into a pressed film of 75 microns in thickness:
Dielectric constant ($\epsilon'$): 5.2
tan $\delta$: 0.72%

COMPARISON EXAMPLE 1

A terpolymer having the same composition as that of Example 3 was produced through suspension polymerization in a perhalogenated solvent of 1,1,2-trichloro-1,2,2-trifluoroethane. After being fully washed and dried, the copolymer was formed into a pressed film of 75 microns in thickness, which showed the following dielectric properties:

Dielectric constant ($\epsilon'$): 5.3
tan $\delta$: 1.02%

The thus obtained film not only was fragile and poor in physical properties but also had a large tan $\delta$.

COMPARISON EXAMPLE 2

In a manner similar to that of Example 1, a terpolymer having mol. % ratios of vinylidene fluoride/ethylene/tetrafluoroethylene of 45/10/45 was produced. The copolymer had a melting point of about 271° C., a fluorine content of 67 mol. % and apparently inferior shapability. The copolymer was formed into a sheet of about 200 microns thickness, which showed the following dielectric properties:

Dielectric constant ($\epsilon'$): 5.2
tan $\delta$: 0.94%

Thus, it will be understood that a terpolymer having too small an ethylene content not only is poor in shapability but also fails to give the desired dielectric properties because of a large tan $\delta$.

What is claimed is:

1. A polymer dielectric comprising a copolymer of 20 to 33 mol. % of vinylidene fluoride, 15 to 45 mol. % of ethylene and 30 to 65 mol. % of tetrafluoroethylene, and having a dielectric constant of 4.0 or above and a dielectric dissipation factor of 0.8% or below at 20° C. and 1 KHz, said copolymer having been obtained through suspension polymerization in water, or bulk polymerization, and having a sufficiently large degree of polymerization to provide said dielectric dissipation factor.

2. A dielectric film laminate comprising a plurality of dielectric films stacked in layers, each dielectric film comprising a copolymer of 20 to 33 mol. % of vinylidene fluoride, 15 to 45 mol. % of ethylene and 30 to 65 mol. % of tetrafluoroethylene, and having a dielectric constant of 4.0 or above and a dielectric dissipation factor of 0.8% or below at 20° C. and 1 KHz, said copolymer having been obtained through suspension polymerization in water, or bulk polymerization, and having a sufficiently large degree of polymerization to provide said dielectric dissipation factor.

3. A polymer dielectric as claimed in claim 1, wherein said copolymer has been obtained through suspension polymerization in water.

4. A polymer dielectric as claimed in claim 1, wherein said copolymer has been obtained through bulk polymerization.

5. A polymer dielectric as claimed in claim 1, which is in the form of a film having a thickness of 1 to 200 microns.

6. A polymer dielectric as claimed in claim 5, which is in the form of a stretched film having a thickness of 1 to 100 microns.

7. A dielectric film laminate as claimed in claim 2, wherein each film has a thickness of 1 to 50 microns.

* * * * *